(12) United States Patent
Banerjee et al.

(10) Patent No.: US 12,255,680 B2
(45) Date of Patent: Mar. 18, 2025

(54) CONTROL OF CONDUCTED EMISSIONS AMONG HETEROGENOUS TRANSCEIVERS IN CONTROLLER AREA NETWORKS

(71) Applicant: Texas Instruments Incorporated, Dallas, TX (US)

(72) Inventors: Deep Banerjee, Bangalore (IN); Lokesh Kumar Gupta, Bangalore (IN); Madhulatha Bonu, Bangalore (IN); Vikas Thawani, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 268 days.

(21) Appl. No.: 17/730,451

(22) Filed: Apr. 27, 2022

(65) Prior Publication Data
US 2023/0353185 A1 Nov. 2, 2023

(51) Int. Cl.
*H04B 1/38* (2015.01)
*H04B 1/04* (2006.01)
*H04B 1/405* (2015.01)
*H04B 1/44* (2006.01)

(52) U.S. Cl.
CPC .......... *H04B 1/405* (2013.01); *H04B 1/0458* (2013.01); *H04B 1/44* (2013.01); *H04B 2001/0408* (2013.01)

(58) Field of Classification Search
CPC ........ H04B 1/405; H04B 1/0458; H04B 1/44; H04B 1/02; H04B 1/04; H04B 1/06; H04B 1/16; H04B 1/38; H04B 1/40
See application file for complete search history.

(56) References Cited

U.S. PATENT DOCUMENTS

| | | | |
|---|---|---|---|
| 11,063,561 B1* | 7/2021 | Huang | ................... H04L 12/40 |
| 2012/0154048 A1 | 6/2012 | Myles | |
| 2016/0196230 A1* | 7/2016 | Pihet | ................... G06F 13/4027 710/314 |

OTHER PUBLICATIONS

Korber et al., "EMC test method for coupling into and decoupling from the wiring harness of automotive components in the VHF band," vol. 3, 2004 Int'l Symp. on Electromagnetic Compatibility (IEEE, 2004), pp. 946-951.
"Road vehicles—Controller area network (CAN)—Part 1: Data link layer and physical signalling," International Standard ISO 11898-1, 1st ed. (ISO 2003).
"Controller Area Network Physical Layer Requirements," Application Report SLLA270 (Texas Instruments Incorporated, 2008).
Robertson, "Simplify CAN bus implementations with chokeless transceivers," SLLY020 (Texas Instruments Incorporated, 2016).

(Continued)

*Primary Examiner* — Tuan Pham
(74) *Attorney, Agent, or Firm* — Valerie M. Davis; Frank D. Cimino

(57) ABSTRACT

A controller area network including one or more first network nodes biased from a first power supply voltage, and a second network node biased from a second, lower, power supply voltage. The second network node includes a transmitter driving a differential voltage onto bus lines to communicate a dominant bus state at a second dominant state common mode voltage, a receiver coupled to the bus lines, sense circuitry to sense a common mode voltage at the bus lines, and control circuitry to control a recessive state common mode voltage in response to the sensed dominant state common mode voltage.

25 Claims, 9 Drawing Sheets

(56) References Cited

OTHER PUBLICATIONS

Corrigan, "Introduction to the Controller Area Network (CAN)," Application Report SLOA101B (Texas Instruments Incorporated, 2016).
International Search Report in corresponding PCT Application No. PCT/US2023/019951, mailed Jul. 27, 2023.

\* cited by examiner

CONTROL OF CONDUCTED EMISSIONS AMONG HETEROGENOUS TRANSCEIVERS IN CONTROLLER AREA NETWORKS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This relates to data communications, and more specifically relates to control of conducted emissions and electromagnetic compatibility (EMC) in network communications using balanced differential signaling.

Modern automobiles may incorporate as many as fifty or more computing devices, such as microprocessors and microcontrollers, for monitoring and controlling various functions. These functions include sophisticated engine control for attaining desired levels of performance, fuel economy, and environmental emission compliance, as well as advanced diagnostics, safety systems, comfort and convenience features, and the like. Electric and hybrid vehicles will also include processor and logic devices in the motor drive and charging subsystems. The distributed computing architecture implemented by these numerous computing devices has greatly reduced the amount of electrical wiring, and thus the weight, of the automobile.

The computing devices and subsystems within each vehicle communicate with one another to coordinate their operation. The Controller Area Network (CAN) standard (ISO 11898) and corresponding specifications (all of which are incorporated by reference in their entirety), promulgated by the International Standardization Organization (ISO) and adopted in the industry, specify a format and protocol for the communication of digital information among modules in a vehicle. In a larger sense, the CAN standard defines a multi-master serial broadcast communications protocol in which the traditional automobile complex wiring harness is replaced by a two-wire bus. Because many of the messages communicated within a vehicle are relatively short, such as measurements of temperature, RPM, etc., communications under the CAN standard take the form of short messages broadcast over the entire network, rather than point-to-point transmission of large blocks of data under the supervision of a central bus master.

The CAN standard implements balanced, differential signaling in order to send binary data at a signaling rate of up to 1 megabit per second (Mbps), or higher under a specified "flexible data rate" variant. This differential signaling prevents the external coupling of noise, in that each half of the differential pair (referred to as CANH and CANL) varies symmetrically, causing the combined noise contributions to destructively interfere. The high immunity to electrical interference provided by this signaling scheme, along with the ability to self-diagnose and repair data errors provided by the CAN standard, have led to the implementation of CAN networks in applications outside of the automotive sphere. For example, CAN networks are now also popular in a variety of industries including building automation, medical systems, and manufacturing operations.

It is within this context that the embodiments described herein arise.

BRIEF SUMMARY OF THE INVENTION

According to an aspect, a transceiver is provided for transmitting and receiving data over first and second lines of a network bus. The transceiver includes a transmitter coupled to first and second terminals adapted to be coupled to the first and second bus lines, wherein the transmitter drives a differential voltage across the terminals to communicate a dominant bus state, with a dominant state common mode voltage. The transceiver also includes a receiver coupled to the terminals, sense circuitry to sense a common mode voltage at the terminals, and control circuitry to control a recessive state common mode voltage in response to the sensed dominant state common mode voltage.

According to another aspect, a controller area network is provided that includes one or more first network nodes biased from a first power supply voltage, and a second network node biased from a second, different, power supply voltage. The second network node includes a transmitter driving a differential voltage onto bus lines to communicate a dominant bus state at a second dominant state common mode voltage, a receiver coupled to the bus lines, sense circuitry to sense a common mode voltage at the bus lines, and control circuitry to control a recessive state common mode voltage in response to the sensed dominant state common mode voltage.

According to another aspect, a method of communicating data in a network over a bus comprised of first and second bus lines is provided. According to the method, communication of a first data level on the bus is performed by applying a differential voltage across the first and second bus lines from a transmitter, the differential voltage establishing a dominant state common mode bus voltage, and communication of a second data level on the bus includes the applying of a recessive state common mode bus voltage to the first and second bus lines from a common mode buffer. At a first transceiver, which includes a common mode buffer configured to apply a first recessive state common mode bus voltage, the method includes sensing the dominant state common mode bus voltage on the first and second bus lines, and applying a second recessive state common mode bus voltage to the first and second bus lines responsive to the sensed dominant state common mode voltage.

Technical advantages enabled by one or more of these aspects may include the ability to include network nodes biased from a lower power supply voltage than existing network nodes in the network, without causing significant conducted emissions due to modulation between the dominant state common mode bus voltage, which is set by the transceiver having control of the bus, and a different recessive state common mode bus voltage. In addition, this capability can save the cost and power of a voltage regulator at each lower voltage node for compatibility with the higher voltage nodes. Compliance with the relevant EMC standards by heterogeneous networks can be attained.

Other technical advantages enabled by the disclosed aspects will be apparent to those of ordinary skill in the art having reference to the following specification together with its drawings.

BRIEF DESCRIPTION OF THE SEVERAL VIEWS OF THE DRAWING

The same reference numbers or other reference designators are used in the drawings to illustrate the same or similar (in function and/or structure) features.

DETAILED DESCRIPTION OF THE INVENTION

The one or more example embodiments described in this specification are implemented into a Controller Area Network (CAN), such as may be implemented in an automobile or other vehicle, as it is contemplated that such implementation is particularly advantageous in that context. However, it is also contemplated that aspects of these embodiments may be beneficially applied in other applications, for example in other CAN implementations as well as with other physical layer protocols utilizing similar signaling. Accordingly, it is to be understood that the following description is provided by way of example only and is not intended to limit the true scope of this invention as claimed.

Figure 1:
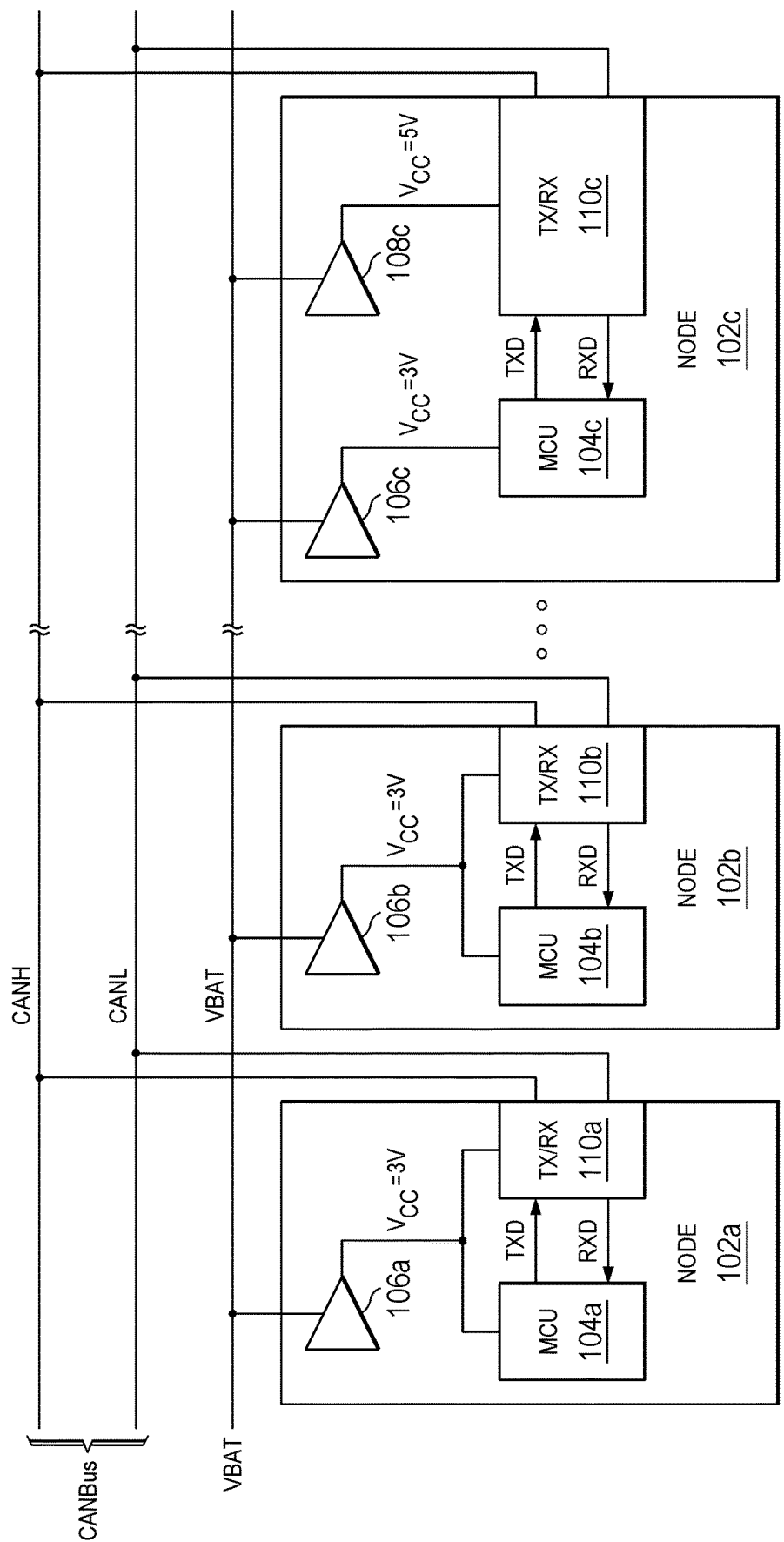
FIG. 1 is an electrical diagram, in block form, of a controller area network (CAN) according to example embodiments.

FIG. 1 illustrates a generalized architecture of a Controller Area Network (CAN), such as implemented according to the ISO 11898 standard promulgated by the International Standardization Organization (ISO) for intra-vehicle communication. As shown in FIG. 1, bus CANBus is a two wire bus including wires CANH and CANL, over which data signals are serially communicated among network nodes 102a, 102b, 102c (generically referred to as node or nodes 102). Nodes 102 correspond to sensors, controllers, and/or other electronic subsystems within the vehicle, and are generally physically distributed throughout the vehicle. Each node 102 may include either or both analog and digital circuitry, which may include custom or programmable computational logic, arranged to carry out its intended function. In this example, each node 102a, 102b, 102c includes a corresponding microcontroller unit (MCU) 104a, 104b, 104c, respectively. Each MCU 104a, 104b, 104c (generically referred to as MCU or MCUs 104) is coupled to a respective transceiver 110a, 110b, 110c (generically referred to as transceiver or transceivers 110) in its node 102. As shown in FIG. 1, each transceiver 110a, 110b, 110c is coupled to wires CANH, CANL of bus CANBus. Each transceiver 110 is constructed and operates to transmit and receive signals (e.g., data, command signals, control signals and/or instructions) to and from other nodes 102 in the network, via their transceivers 110. In this example, control signals on lines TXD, RXD are communicated between each transceiver 110a, 110b, 110c and its corresponding MCU 104a, 104b, 104c. Line TXD carries a signal controlling transceiver 110 to transmit a dominant state on bus CANBus, and line RXD communicates a control signal from transceiver 110 indicating the sensing of a recessive state on bus CANBus.

In some implementations, other functions may also reside on bus CANBus. For example in some vehicles, a gateway (not shown in FIG. 1) may be provided on bus CANBus for communication with external systems, such as through an on-board diagnostic (OBD) port.

According to the ISO 11898 standard, the CAN network operates as a multi-master, message broadcast system, in that any of network nodes 102a, 102b, 102c can serve as the bus master for communications with one or more of the other nodes 102 using broadcast messaging. The CAN communication protocol is a carrier-sense, multiple-access protocol, in that each node 102 must wait for a specified interval of inactivity on bus CANBus before initiating transmission of a message. Bus collisions among nodes 102 attempting to transmit simultaneously are resolved under the CAN standard via bit-wise arbitration, based on the priority of each message as indicated in an identifier field of the message. The node 102 that is transmitting a message with the highest priority relative to the others always wins bus access.

Figure 2A:
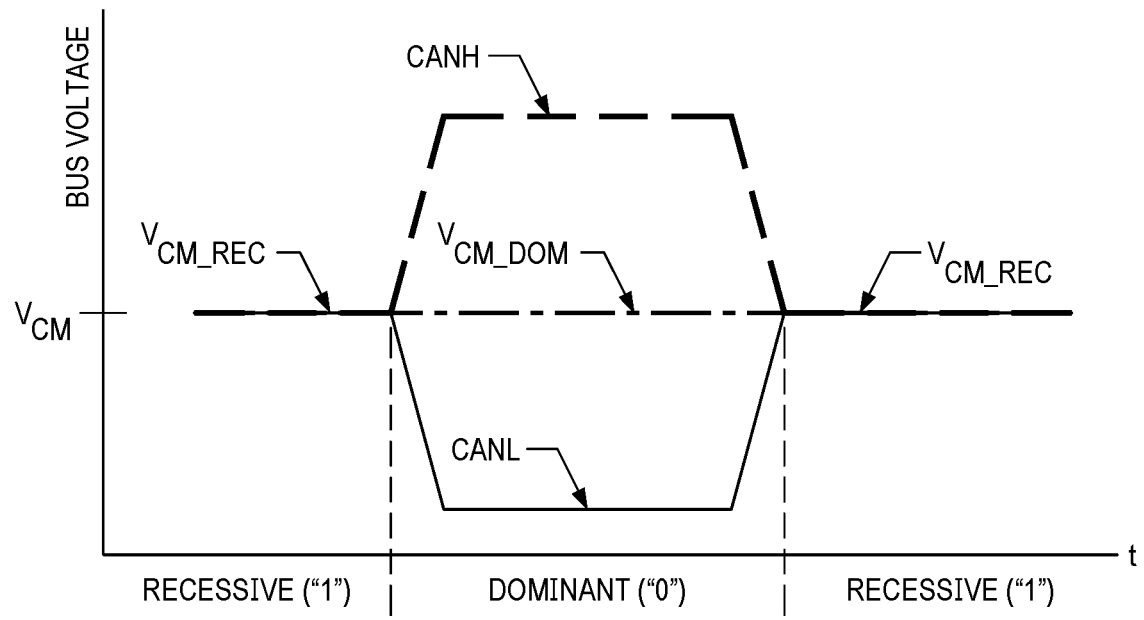
FIG. 2A is a timing diagram illustrating data levels on bus lines in a CAN network.

FIG. 2A illustrates the physical layer data signaling protocol according to the CAN standard as applied to bus CANBus of FIG. 1. As mentioned above, the CAN specification implements balanced, differential signaling. This signaling communicates the binary digital values "0" and "1" as "dominant" and "recessive" differential states, respectively. As shown in FIG. 2A, the dominant ("0" data level) state is communicated on bus CANBus by driver circuitry driving line CANH to a high voltage while driving line CANL to a low level. A common mode bus voltage $V_{CM\_DOM}$ is defined at the midpoint of these two levels. Conversely, the recessive ("1" data level) state is communicated on bus CANBus by driver circuitry presenting a high impedance to lines CANH, CANL, while a common mode voltage buffer in the receiver circuitry of each node 102 biases both of lines CANH, CANL to a common mode voltage $V_{CM\_REC}$. In operation, only one transceiver 110 in the network can drive the dominant state at any given time.

Figure 2B:
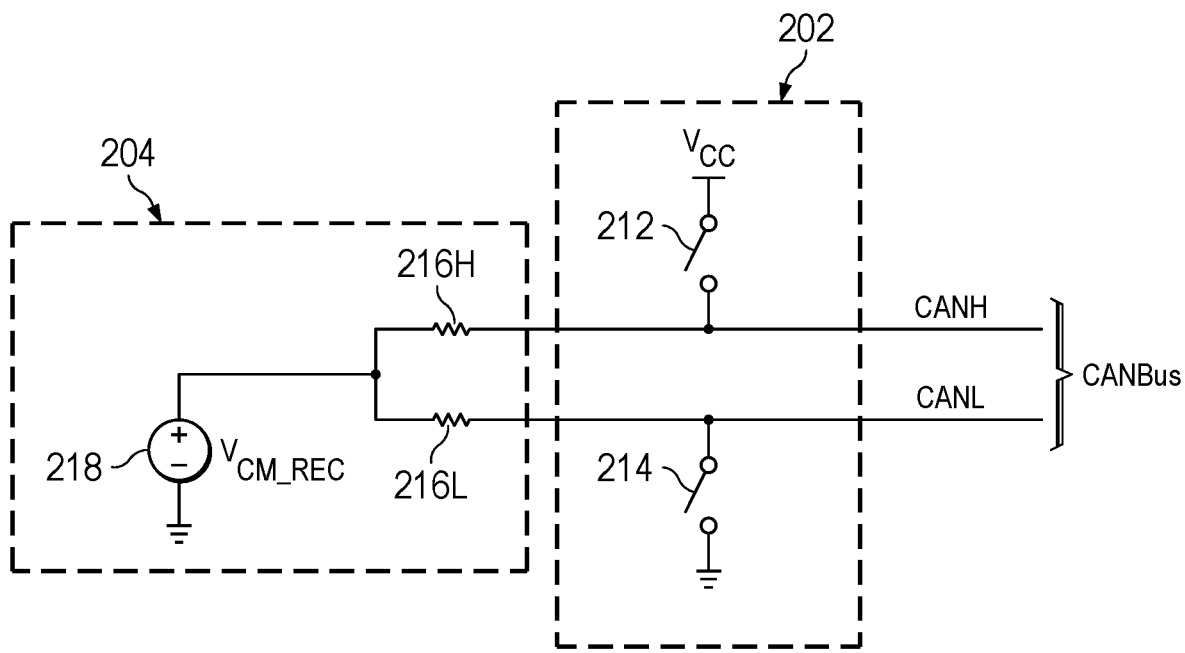
FIG. 2B is an electrical diagram, in schematic form, illustrating a circuit model for a transceiver in a network node of a CAN network.

FIG. 2B illustrates a circuit model for digital signaling on bus CANBus by way of these dominant and recessive states, according to the CAN specification. Driver circuitry model 202 for the transceiver 110 of the network node 102 winning bus arbitration is modeled by switch 212 coupled between power supply voltage $V_{CC}$ and line CANH of bus CANBus, and by switch 214 coupled between line CANL of bus CANBus and circuit ground. Switches 212, 214 may be realized in practice by transistor circuits. Receiver circuitry of transceiver 110 includes a common mode buffer, which is modeled in FIG. 2B by common mode buffer model 204. Buffer model 204 includes resistor 216H coupled between line CANH and voltage source 218, resistor 216L coupled between line CANL, and voltage source 218. In this common mode buffer model 204, voltage source 218 applies common mode voltage $V_{CM\_REC}$ to lines CANH, CANL through resistors 216H, 216L to set the common mode bus voltage $V_{CM\_REC}$ in the recessive ("1") state. According to this model of FIG. 2B, the resistances of resistors 216H, 216L are much greater than the "on" state resistance of switches 212, 214. In a typical example according to the CAN specification, each of resistors 216H, 216L has a resistance of about 40 kΩ while the "on" resistance of each of switches 212, 214 is on the order of 60Ω.

The circuit model of FIG. 2B provides an illustration of the operation of transceivers 110 in the network of FIG. 1 in communicating digital data. For the case in which a transceiver 202 is driving bus CANBus to its dominant differential state (the "0" data level), switches 212 and 214 in driver circuitry model 202 will both be closed. Line CANH will be pulled toward the $V_{CC}$ power supply voltage, while line CANL will be pulled toward ground. The specific voltages to which lines CANH, CANL are driven will depend on the "on" resistance of switches 212, 214. Dominant state common mode bus voltage $V_{CM\_DOM}$ is defined as the midpoint voltage between the voltages $V_{CANH}$ and $V_{CANL}$ on lines CANH, CANL, respectively:

$$V_{CM\_DOM} = \frac{V_{CANH} + V_{CANL}}{2} \quad (1)$$

Because the resistances of switches 212, 214 in their closed, or on, state (e.g., 60Ω) is much lower than the resistances (e.g., 40 kΩ) of resistors 216H, 216L, resistors 216H, 216L do not play a role in determining dominant state common mode voltage $V_{CM\_DOM}$. For the recessive differential state (the "1" data level), on the other hand, switches 212 and 214 in driver circuitry model 202 are open. Lines CANH and CANL of bus CANBus are both biased to a recessive state common mode voltage $V_{CM\_REC}$ of voltage source 218 in receiver circuitry model 204 through their respective resistors 216H, 216L.

In controller area networks that are homogenous in the sense that all network node transceivers 110 are biased from the same power supply voltage (e.g., $V_{CC}$=5V, nominally), the common mode bus voltage $V_{CM\_REC}$ for bus CANBus in the recessive state can readily be made equal to the common mode voltage $V_{CM\_DOM}$ in the dominant state. In this case, the common mode voltage of bus lines CANH, CANL will not modulate with the data level being communicated over bus CANBus. Since many microcontroller-based nodes are constructed using 5V technologies, many conventional controller area networks are homogeneous with respect to power supply voltage.

However, microcontrollers, microprocessors, and other digital and analog circuitry, including transceivers, that operate from lower power supply voltages (e.g., $V_{CC}$=3V, nominally) are gaining popularity, in large part due to the reduced power consumption and enhanced device performance afforded by these modern integrated circuits. To gain these advantages, the utilization of these lower voltage devices in automotive and other controller area network nodes is therefore desirable. However, the long design cycle times in many systems, such as automotive systems, generally preclude the rapid adoption of newer technology automotive devices. As a result, it is contemplated that many controller area networks may be constructed with some network nodes 102 constructed to be biased from lower power supply voltages (e.g., $V_{CC}$=3V, nominally) while other nodes 102 will continue to include circuitry constructed according to older technologies requiring bias from higher power supply voltages (e.g., $V_{CC}$=5V, nominally).

For example, referring to the network architecture of FIG. 1, node 102c includes circuitry, namely its transceiver 110c, that is constructed to be biased from a power supply voltage $V_{CC}$ nominally at 5V. Accordingly, node 102c includes voltage regulator 108c that receives an external voltage from line VBAT (shared, in this example, by all nodes 102 in the network) and generates a nominal 5V power supply voltage $V_{CC}$ for use by transceiver 110c within node 102c. Circuitry within nodes 102a and 102b, on the other hand, are constructed to be biased by a lower power supply voltage $V_{CC}$, for example nominally at 3V. Accordingly, each of nodes 102a, 102b include a voltage regulator 106a, 106b that generates a nominal 3V power supply voltage $V_{CC}$ from the external voltage on line VBAT. This power supply voltage $V_{CC}$ is applied by regulator 106a to bias MCU 104a and transceiver 110a within node 102a; MCU 104b and transceiver 110b in node 102b are similarly biased at $V_{CC}$=3V from regulator 106b in node 102b.

Figure 2C:
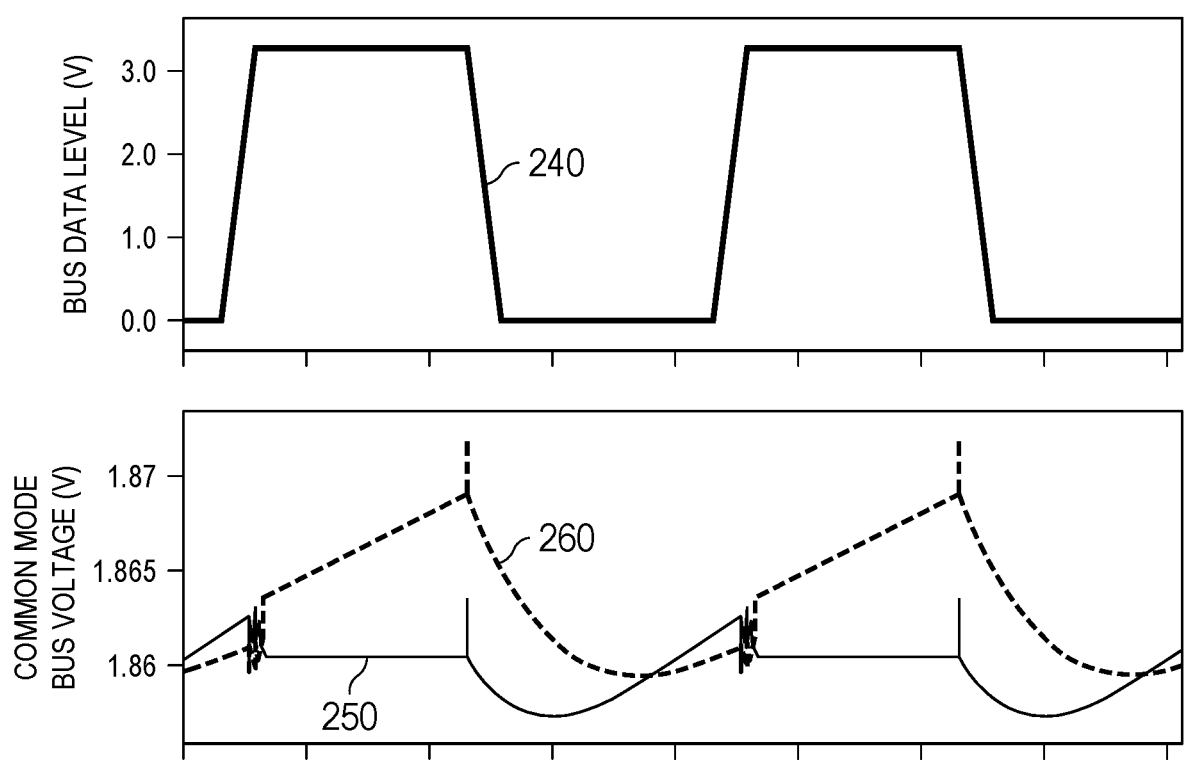
FIG. 2C is a plot of common mode bus voltage in response to changing data levels on a CAN bus for homogeneous and heterogeneous CAN networks.

This heterogeneity in the $V_{CC}$ power supply voltage among network nodes in a controller area network has been observed, in connection with these example embodiments, to suffer from radio frequency (RF) emissions conducted on the network bus. It has further been observed, in connection with these examples, that these conducted emissions are due in large part to data-dependent modulation of the common mode bus voltage among network nodes that are heterogenous with respect to power supply voltage. For example, if both the transmitting node (e.g., the node winning arbitration) and the receiving node in a two-node CAN network are biased from a common power supply voltage $V_{CC}$, the dominant state ("0") common mode bus voltage $V_{CM\_DOM}$ can match the recessive state ("1") common mode bus voltage $V_{CM\_REC}$. For a homogenous network in which all network nodes are biased from power supply voltage $V_{CC}$ nominally at 5V, the common mode bus voltage $V_{CM\_DOM}$=$V_{CM\_REC}$=2.5V, while in a homogeneous network in which all network nodes are biased from power supply voltage $V_{CC}$ nominally at 3V, the common mode bus voltage $V_{CM\_DOM}$=$V_{CM\_REC}$=1.86V. This lower common mode bus voltage $V_{CM\_DOM}$=$V_{CM\_REC}$=1.86V is due to insufficient headroom available from the transceiver driver stack (modeled by circuit model 202 of FIG. 2B) to attain a dominant state common mode voltage $V_{CM\_DOM}$=2.5V when biased from $V_{CC}$=3V. Rather, the 3V bias permits the transceiver driver stack to reach only a dominant state common mode voltage $V_{CM\_DOM}$=1.86V. Plot 250 in FIG. 2C illustrates the common mode bus voltage, from simulation, in response to the communicated data levels of plot 240, for the case of a homogenous two-node network in which both the transmitting and receiving nodes are biased from a nominal 3V power supply voltage $V_{CC}$.

However, for the heterogenous case in which the transmitting and receiving network nodes are biased from different power supply voltages (for example, shown in FIG. 1, in which transceivers 110a, 110b of nodes 102a, 102b are biased from a $V_{CC}$ power supply voltage nominally at 3V, while transceiver 110c in node 102c is biased from a $V_{CC}$ power supply voltage nominally at 5V), the common mode voltage at bus CANBus can vary with the data level being communicated. This modulation of the common mode bus voltage with data is due to the inability of a transmitting node biased from $V_{CC}$=3V to drive lines CANH, CANL to a dominant state common mode voltage $V_{CM\_DOM}$=2.5V that matches the recessive state common mode voltage $V_{CM\_REC}$ established by receiving nodes biased at $V_{CC}$=5V. Plot 260 in FIG. 2C illustrates the common mode bus voltage, from simulation, for a heterogenous network situation in which the recessive state common mode voltage $V_{CM\_REC}$=2.5V while the dominant state $V_{CM\_DOM}$=1.86V. As shown by this plot 260, common mode bus voltage $V_{CM}$ tends to increase from 1.86V toward 2.5V during the duration of the recessive state ("1" data level) on bus CANBus, and is then pulled lower toward 1.86V during the dominant state ("0" data level). This modulation in common mode bus voltage will manifest as data-dependent RF noise in the network communications. Further simulation of the noise performance of such a heterogenous network has exhibited unacceptable noise behavior under the "Zwickau" test conditions specified by the International Standard IEC TS 62228, "Hardware Requirements for LIN, CAN and FlexRay Interfaces in Automotive Application" (Revision 1.3, 2012). This excessive noise limits the ability to incorporate 3V network nodes into a CAN network that must still retain one or more legacy (5V) devices.

This data-dependent modulation could be avoided by including multiple voltage regulators within a network node, for example with one regulator generating the higher $V_{CC}$=5V power supply voltage for the transceiver circuitry and another regulator generating the lower $V_{CC}$=3V power supply voltage for the MCU and other low voltage circuitry in the node. Such an arrangement would allow all nodes in a heterogenous network to communicate using the 5V common mode bus voltage of 2.5V, regardless of the $V_{CC}$ bias of MCUs 104 in the various nodes. By way of example, network node 102c is constructed in this fashion to include an additional regulator 106c providing the lower $V_{CC}$=3V power supply voltage to its MCU 104c. However, the power consumed by these additional regulators in the 3V nodes, as well as the cost and area required for those regulator, can be undesirable.

According to example embodiments, lower voltage network node transceivers in heterogeneous CAN networks include control circuitry configured and operable to control the common mode bus voltage for the recessive state to match the dominant state common mode bus voltage established by a transmitting network node, regardless of the power supply voltage biasing that transmitting node.

Figure 3:
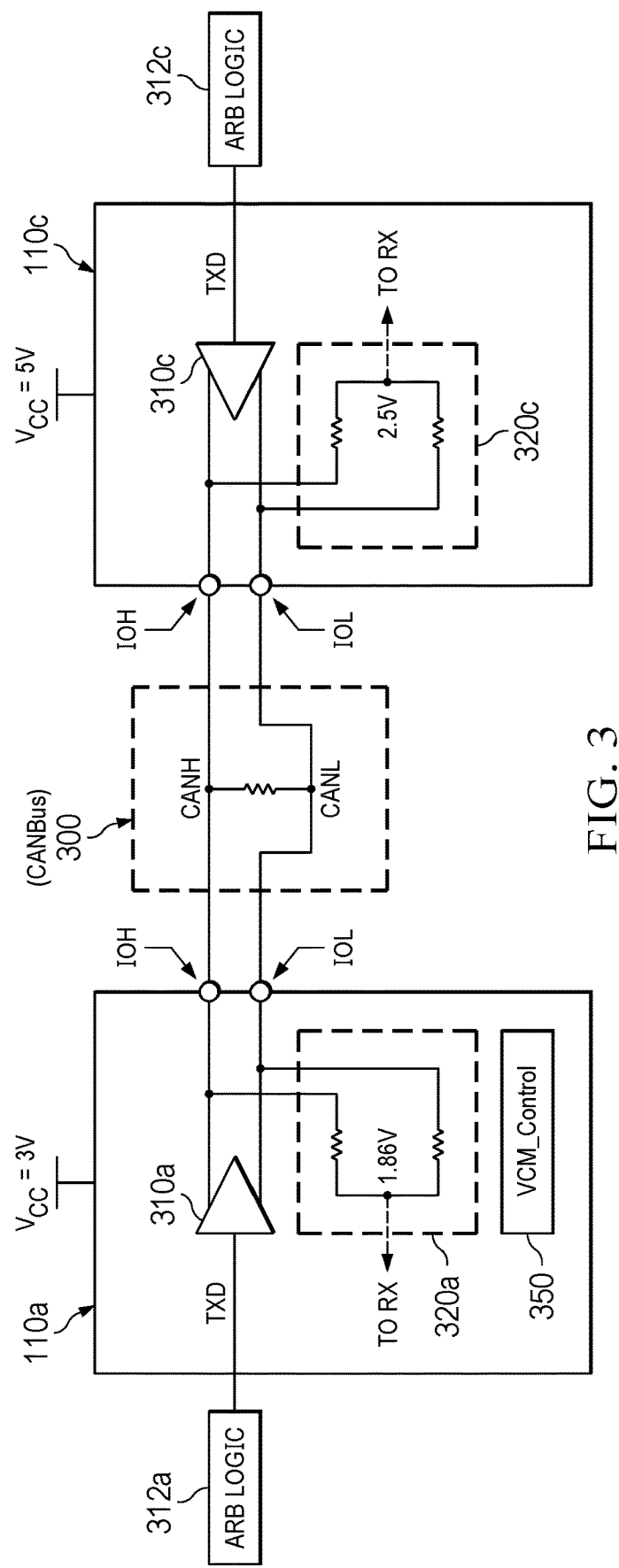
FIG. 3 is an electrical diagram, in block and schematic form, of transceivers in a CAN network according to example embodiments.

FIG. 3 illustrates a simplified architecture for CAN bus communications according to these example embodiments, from the standpoint of two transceivers 110a, 110c coupled to the bus. Specifically, the architecture of FIG. 3 includes transceiver 110a associated with 3V network node 102a and transceiver 110c associated with 5V network node 102c, both in the arrangement of FIG. 1. Transceivers 110a and 110c each have a pair of terminals IOH, IOL that are connected to bus lines CANH, CANL, respectively, of bus CANBus, which is modeled in FIG. 3 by transmission line model 300 (e.g., as a 600 impedance coupled between lines CANH, CANL).

Transceiver 110a includes transmitter 310a and receiver 320a, both coupled to bus lines CANH, CANL. For purposes of this description, transmitter 310a is operable to drive lines CANH, CANL in the dominant state during such time as its network node 110a has won bus arbitration from among the other nodes 102 in the network, as may be determined by arbitration logic 312a and communicated to transmitter 310a on line TXD. Arbitration logic 312a may be implemented as part of MCU 104a, or alternatively may be separate logic circuitry located elsewhere within node 102a. Receiver circuitry of transceiver 110a includes a receiver common mode buffer 320a, shown as a circuit model in FIG. 3 by effective 40 kΩ resistors (e.g., two separate resistors, as shown in FIG. 3, each of which having a magnitude of 40 kΩ) coupling a common mode voltage (e.g., nominally 1.86V) to terminals IOH, IOL, and thus bus lines CANH, CANL. Receiver common mode buffer 320a communicates received data to a receive data path in its network node 102a. As noted above, transceiver 110a and its network node 102a are biased from a nominal 3V power supply voltage $V_{CC}$.

Transceiver 110c is similarly constructed, and as such includes transmitter 310c and receiver common mode buffer 320c coupled to bus lines CANH, CANL via its terminals IOH, IOL, respectively. Arbitration logic 312c in MCU 104c or elsewhere in network node 102c determines when node 102c has won the bus arbitration and that transceiver 110c is to issue a dominant state on bus CANBus, and communicates that condition to transmitter 310c via line TXD. Receiver common mode buffer 320c of transceiver 110c is shown by a circuit model including a common mode voltage coupled through effective 40 kΩ resistors (e.g., two separate resistors, as shown in FIG. 3, each of which having a magnitude of 40 kΩ) coupled to lines CANH, CANL. For this case in which transceiver 110c and its network node are biased from a nominal 5V power supply voltage $V_{CC}$, the recessive state common mode voltage $V_{CM\_REC}$ applied by receiver common mode buffer 320c is 2.5V.

According to these example embodiments, 3V transceiver 110a includes common mode voltage control circuitry 350. Common mode voltage control circuitry 350 is configured and operable to sense the common mode voltage on lines CANH, CANL in the dominant state, as set by the transmitting network node 102 (which may include network node 102a itself), and based on that sensed voltage, control the common mode voltage for the recessive state applied by transceiver 110a to match that dominant state common mode bus voltage. In this implementation, common mode voltage control circuitry 350 need only be provided for lower voltage network nodes 102 (e.g., nodes 102a, 102b of FIG. 1). This enables the implementation of lower power supply voltage devices in "legacy" CAN networks, without requiring replacement of existing network node circuits.

Figure 4:
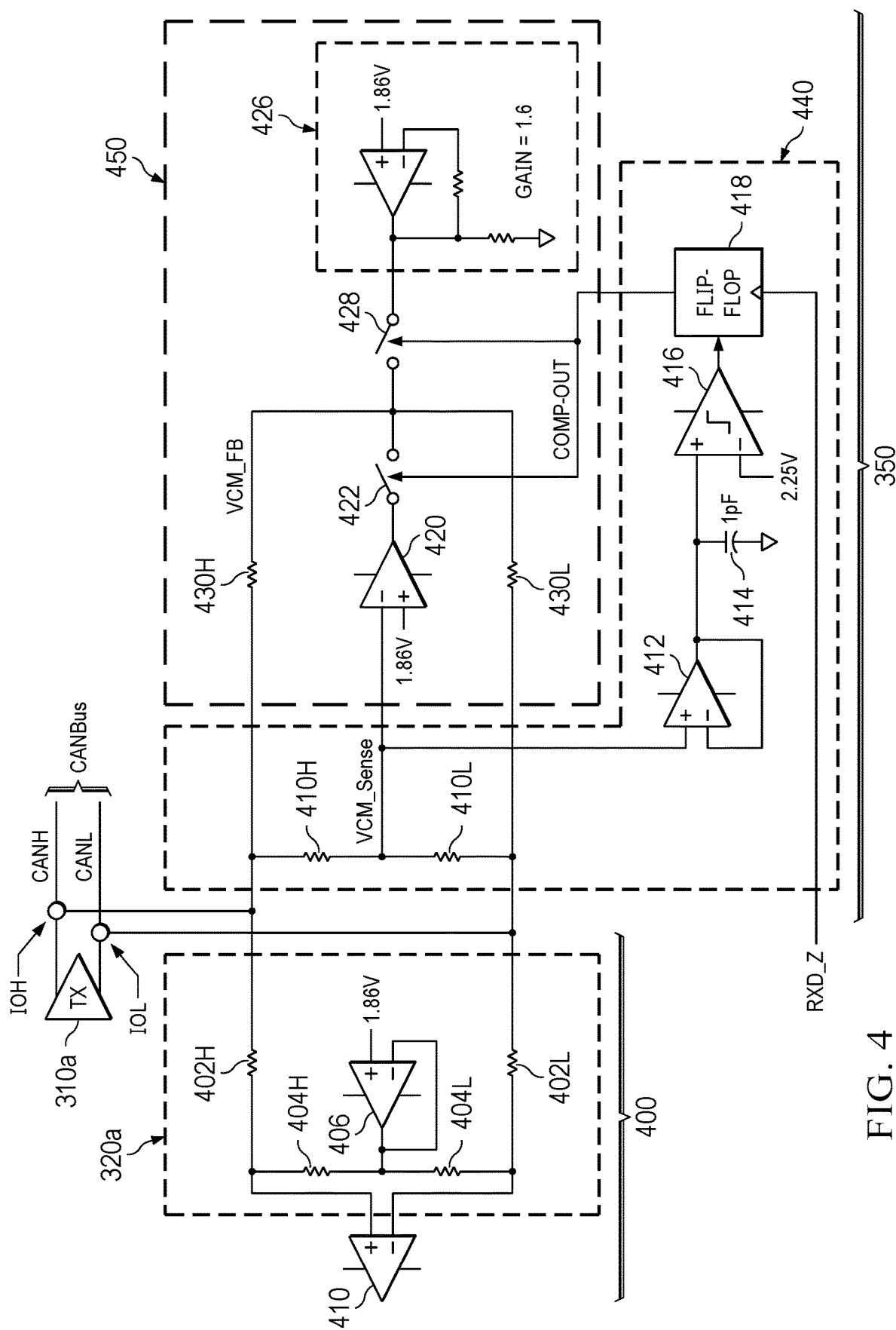
FIG. 4 is an electrical diagram, in schematic form, of common mode voltage control circuitry in combination with transceiver circuitry according to an example embodiment.

FIG. 4 illustrates the construction of common mode voltage control circuitry 350, as applied to transmitter 310a and receiver 400 of transceiver 110a according to an example embodiment. In this example implementation, transmitter 310a has outputs coupled to terminals IOH, IOL, which couple to respective bus lines CANH, CANL of bus CANBus, as described above. Bus lines CANH, CANL are also coupled via terminals IOH, IOL, respectively, to inputs of receiver 400 at its common mode buffer 320a. In this example, receiver 400 includes receive comparator 410, which has a positive input coupled to bus line CANH via resistor 402H, and a negative input coupled to bus line CANL via resistor 402L; the output of comparator 410 is coupled to a receive data path of network node 110a. As described relative to the circuit model of FIG. 3, receiver common mode buffer 320a includes voltage follower 406 which sets the common mode voltage $V_{CM\_REC}$ of bus lines CANH, CANL through resistors 404H, 404L, respectively. In this example, as will be described in further detail below, resistors 402H, 402L each have a resistance that is significantly larger (e.g., 50 times larger) than the resistances of resistors 404H, 404L, respectively. In this example of receiver common mode buffer 320a, the sum of the resistances of resistors 402H and 404H, and the sum of the resistances of resistors 402L and 404L, are each about 40 kΩ as noted in the circuit model of FIG. 3.

Common mode voltage control circuitry 350 in this implementation includes sense circuitry 440 and control circuitry 450. Sense circuitry 440 is configured and operable to sense the common mode voltage on lines CANH, CANL for the dominant state, as set by the transmitting network node 102. Control circuitry 450 is configured and operable to control the common mode voltage for the recessive state to be applied at terminals IOH, IOL to match the dominant state common mode bus voltage sensed by sense circuitry 440.

In this example, sense circuitry 440 includes resistors 410H, 410L coupled in series between bus lines CANH, CANL. Resistors 410H, 410L present relatively large resistances, for example with each resistor having a resistance on the order of 300 kΩ, to limit loading on bus CANBus. Voltage follower 412 in sense circuitry 440 has a positive input coupled to node VCM_Sense between resistors 410H, 410L, and a negative input coupled to its output, which is also coupled to a positive input of comparator 416. Capacitor 414 is coupled between the output of voltage follower 412 and circuit ground, to limit high frequency noise. Comparator 416 receives a threshold voltage at its negative input, and has an output coupled to an input of flip-flop 418. The clock input of flip-flop 418 receives line RXD_Z, which in this example is the logical inverse of line RXD issued from transceiver 110a. In this arrangement, line RXD_Z is at a logic high, or "1", level while bus CANBus is in the dominant state, and is at a logic low, or "0", level while bus CANBus is in the recessive state. The threshold voltage applied to the negative input of comparator 416 is selected to be between the possible dominant state common mode voltages at bus CANBus. For the example in which the possible dominant state common mode bus voltages are 2.5V and 1.86V, corresponding to 5V and 3V transmitting nodes, respectively, the threshold voltage applied to the negative input of comparator 416 may be about 2.25V.

In operation, sense circuitry 440 operates to compare the common mode bus voltage appearing at node VCM_Sense for a dominant state on bus CANBus with the threshold voltage applied to comparator 416 (e.g., 2.25V). In response to a sensed dominant state common mode bus voltage above the threshold voltage (e.g., $V_{CM\_DOM}$=2.5V, from a 5V transmitting node 102), comparator 416 will issue a "1" logic state to flip-flop 418. In response to a sensed dominant state common mode bus voltage below the threshold voltage (e.g., $V_{CM\_DOM}$=1.86V, from a 3V transmitting node 102), comparator 416 will issue a "0" logic state to flip-flop 418. Upon bus CANBus making a transition from the recessive state to the dominant state, the corresponding transition ("0" to "1") on line RXD_Z clocks flip-flop 418 to store the output from comparator 416. The output of flip-flop 418 communicates this result of the sensing operation to control circuitry 450.

More specifically, the output of flip-flop 418 is coupled on line Comp-Out to control terminals of switches 422 and 428 of control circuitry 450. In this example, a "0" logic state output by flip-flop 418, corresponding to the sensed common mode bus voltage being below the threshold voltage at comparator 416, will close switch 422 and open switch 428. Conversely, a "1" logic state output by flip-flop 418, corresponding to the sensed common mode bus voltage being above the threshold voltage at comparator 416, will open switch 422 and close switch 428.

Switch 422 is coupled between an output of operational amplifier ("op amp") 420 and node VCM_FB. Op amp 420 has a negative input (e.g., an inverting input or a "−" input) coupled to node VCM_Sense between resistors 410H, 410L, and a positive input (e.g., a non-inverting input or a "+" input) receiving a desired common mode bus voltage for the case in which the sensed common mode bus voltage is below the threshold voltage at comparator 416. In this example, the desired common mode bus voltage applied to op amp 420 is 1.86V, corresponding to the dominant state common mode bus voltage for a 3V transmitting node 102. Node VCM_FB is coupled to bus lines CANH, CANL through resistors 430H, 430L, respectively. The resistance of resistors 430H and/or 430L may be around 30 kΩ.

Switch 428 is coupled between an output of op amp circuit 426 and node VCM_FB. Op amp circuit 426 includes an op amp and the appropriate feedback network (e.g., a resistor coupled between one input and the output of the op amp and another resistor coupled between the op amp output and ground) to generate, at its output, a desired common mode bus voltage for the case in which the sensed common mode bus voltage is above the threshold voltage at comparator 416. In this example, this desired common mode bus voltage is 2.5V, corresponding to the dominant state common mode bus voltage for a 5V transmitting node 102. To provide this 2.5V level, as will be described below, op amp circuit 426 in this example includes an op amp receiving a voltage of 1.86V at a positive input, with a feedback resistor network coupled between the op amp output and a negative input of the op amp configured to establish a gain of 1.6.

Figure 5A:
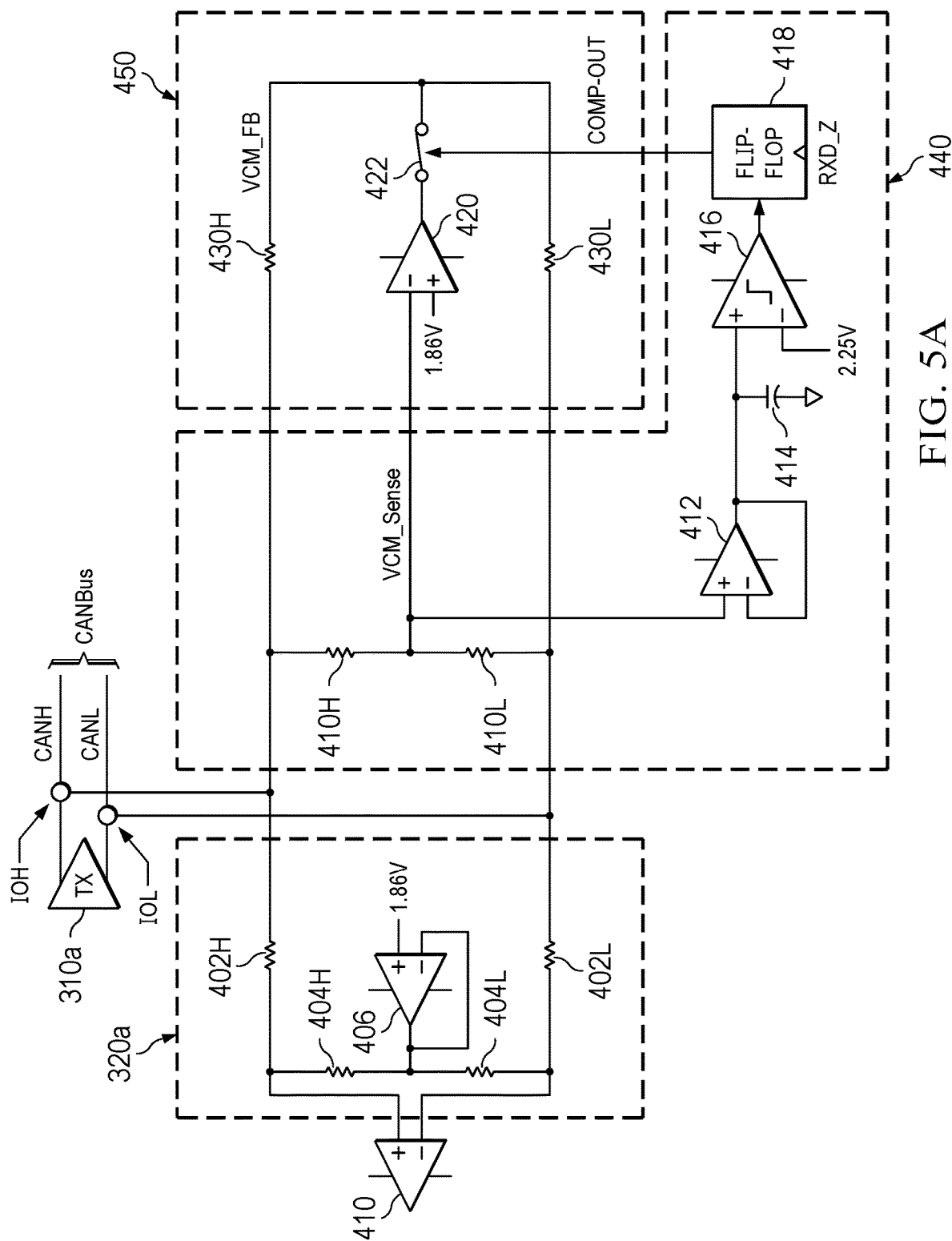
FIG. 5A is an electrical diagram, in schematic form, of the common mode control circuitry of the example embodiment of FIG. 4 for an example of a lower voltage transmitting network node.

FIG. 5A illustrates the operation of the example of common mode voltage control circuitry 350 of FIG. 4 for the case in which the transmitting node 102 is biased from power supply voltage $V_{CC}$ at 3V. This transmitting node may be another network node (e.g., node 102b) in the CAN network, or may be network node 102a itself. In this case, the dominant state common mode bus voltage $V_{CM\_DOM}$ will be 1.86V according to the CAN standard. According to this example embodiment, common mode voltage control circuitry 350 will operate to maintain a recessive state common mode bus voltage $V_{CM\_REC}$ that substantially matches the dominant state common mode bus voltage $V_{CM}$ Dom of 1.86V.

Sense circuitry 440 operates to sense the dominant state common mode bus voltage $V_{CM\_DOM}$. In this example, the common mode bus voltage $V_{CM}$ appears at node VCM_Sense between resistors 410H, 410L, and is applied to the positive input of voltage follower 412. Comparator 416 compares this voltage to the threshold voltage of 2.25V in this example. Because the dominant state common mode voltage $V_{CM\_DOM}$ from the 3V transmitting node 102 is 1.86V in this example case, comparator 416 issues or outputs a "0" logic level that is clocked into flip-flop 418 by the "0" to "1" transition on line RXD_Z as bus CANBus transitions to the dominant state. Upon propagating to line Comp-Out at the output of flip-flop 418, this "0" logic level in turn closes switch 422 in control circuitry 450 as shown in FIG. 5A. Op amp 420 will control the recessive state common mode bus voltage $V_{CM\_REC}$ in this case.

As noted above relative to FIG. 4, the negative input of op amp 420 receives the sensed common mode bus voltage at node VCM_Sense, and the positive input receives a reference voltage set to the desired recessive mode common mode bus voltage $V_{CM\_REC}$, which in this case is 1.86V and which matches the dominant mode common mode bus voltage $V_{CM\_DOM}$ established by node 102a (and other 3V nodes 102 in the network). The output of op amp 420 at node VCM_FB is coupled through closed switch 422 to bus lines CANH, CANL through resistors 430H, 430L, respectively. Op amp 420 thus drives a voltage at node VCM_FB that is sufficiently low to pull the recessive state common mode bus voltage $V_{CM\_REC}$ of bus lines CANH, CANL to 1.86V, matching the dominant mode common mode bus voltage $V_{CM\_DOM}$ for this case in which the transmitting node 102 is biased from power supply voltage $V_{CC}$=3V. This recessive state common mode bus voltage $V_{CM\_REC}$ maintained by op amp 420 matches that applied by voltage follower 406 in receiver common mode buffer 320*a*, since this transceiver 110*a* is in a 3V network node 102*a*. This feedback control applied by op amp 420 for the recessive mode thus reduces the modulation of the common mode bus voltage $V_{CM}$ with the data state communicated on bus CANBus.

Figure 5B:
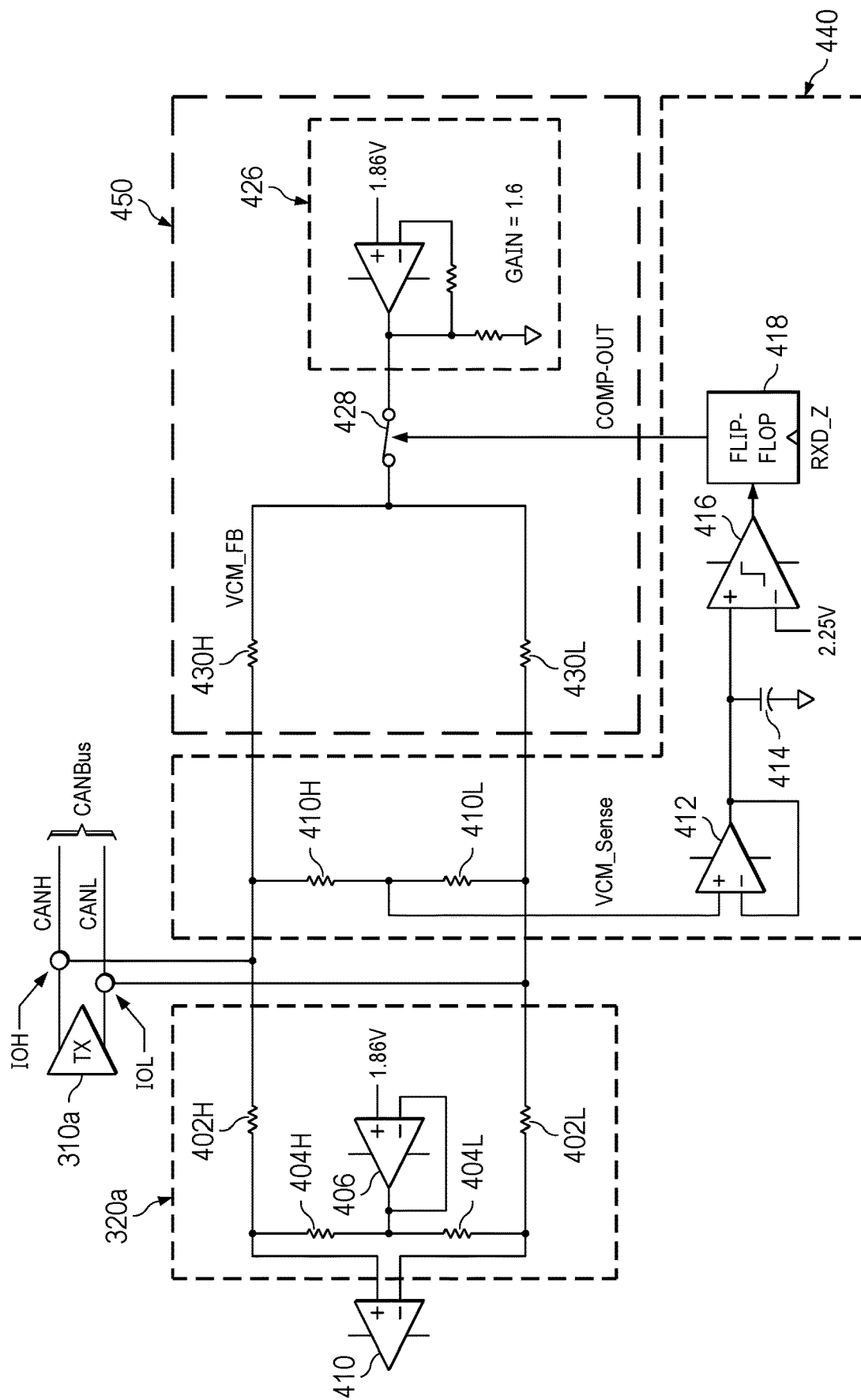
FIG. 5B is an electrical diagram, in schematic form, of the common mode control circuitry of the example embodiment of FIG. 4 for an example of a higher voltage transmitting network node.

FIG. 5B illustrates the operation of the example of common mode voltage control circuitry 350 shown in FIG. 4 for the case in which the transmitting node 102 is biased from power supply voltage $V_{CC}$ at 5V. Because transceiver 110*a* is in a 3V network node 102*a*, this 5V transmitting node 102 will be another network node (e.g., node 102*c*) in the CAN network. In this case, the dominant state common mode bus voltage $V_{CM\_DOM}$ will be 2.5V according to the CAN standard. According to this example embodiment, common mode voltage control circuitry 350 will operate to establish a recessive state common mode bus voltage $V_{CM\_REC}$ that matches the 5V dominant state common mode bus voltage $V_{CM\_DOM}$=2.5V.

In this case, sense circuitry 440 senses the dominant state common mode bus voltage $V_{CM\_DOM}$ at node VCM_Sense between resistors 410H, 410L, which is applied to the positive input of voltage follower 412. Because dominant state common mode bus voltage $V_{CM\_DOM}$ equals 2.5V, which is larger than the threshold voltage of 2.25V, comparator 416 issues or outputs a "1" logic level that is clocked into flip-flop 418 by the "0" to "1" transition on line RXD_Z as bus CANBus transitions to the dominant state. Upon propagating to line Comp-Out from the output of flip-flop 418, this "1" logic level closes switch 428 (and opens switch 422, not shown in FIG. 5B) in control circuitry 450 as shown in FIG. 5B. Op amp circuit 426 will thus present an output voltage at node VCM_FB that establishes, at bus lines CANH, CANL, a recessive state common mode bus voltage $V_{CM\_REC}$ of 2.5V to match the dominant state common mode bus voltage $V_{CM\_DOM}$=2.5V.

As noted above relative to FIG. 4, op amp circuit 426 generates a feedback voltage at node VCM_FB. This feedback voltage at node VCM_FB operates to pull the common mode voltage onto bus lines CANH, CANL of bus CANBus toward the desired recessive state common mode voltage of 2.5V. The actual level of the feedback voltage at node VCM_FB to be generated by op amp circuit 426 will depend on the resistances presented by resistors 430H, 402H, 404H for bus line CANH and resistors 430L, 402L, 404L for bus line CANL. In the circuit arrangement of FIG. 5B for this example case, op amp circuit 426 is configured to apply a feedback voltage at node VCM_FB that establishes a Thévenin, or "look-in," voltage $V_{CM\_OUT}$ at bus lines CANH, CANL, "looking in" to the output of transmitter 310A in its high impedance state (e.g., with switches 212, 214 of FIG. 2B open), substantially matching the recessive state common mode bus voltage $V_{CM\_REC}$ of 2.5V and thus substantially matching the dominant mode common mode bus voltage $V_{CM\_DOM}$ established by node 102*c* (and other 5V nodes 102 in the network). For example, the extent to which the voltage $V_{CM\_OUT}$ matches these dominant and recessive state common mode voltages may be sufficiently close that the data-dependent RF noise meets the appropriate noise specifications and performance for the particular network application. For the case in which resistors 430H, 430L are both 30 kΩ resistors, and each pair of resistors 402H, 404H and 402L, 404L present a 30 kΩ resistance, op amp circuit 426 is constructed to amplify a reference voltage 1.86V by a gain of 1.6 to drive a voltage of 2.97V at node VCM_FB. The look-in, or Thevenin, voltage $V_{CM\_OUT}$ established on each of bus lines CANH, CANL by the arrangement of FIG. 5B in this example case can be determined as:

$$V_{CM\_OUT} = \frac{40\ k\Omega \cdot 1.86\ V \cdot 1.6 + 30\ k\Omega \cdot 1.86\ V}{40\ k\Omega + 30\ k\Omega} = 2.5\ V \quad (2)$$

Accordingly, the recessive state common mode bus voltage $V_{CM\_REC}$ maintained by op amp circuit 426 in the arrangement of FIG. 5B matches the dominant mode common mode bus voltage $V_{CM\_DOM}$ for this case in which the transmitting node 102 is biased from power supply voltage $V_{CC}$=5V.

According to this example embodiment described above relative to FIGS. 4, 5A, and 5B, significant reduction in the conducted emissions from bus traffic in CAN networks can be attained. More specifically, modulation in the common mode bus voltage between the dominant state voltage $V_{CM\_DOM}$ and the recessive state voltage $V_{CM\_REC}$ can be substantially reduced, resulting in a corresponding reduction in emissions at lower RF frequencies at which the data modulates. It is contemplated that sufficient EMC margin relative to the Zwickau limits over the relevant frequencies can be provided, such that lower voltage network nodes can be implemented into legacy CAN networks operating according to CAN standards. These benefits can be attained without requiring an additional voltage regulator for the node transceiver to be implemented in the lower voltage network nodes.

The example of FIG. 5A, in which the transmitting node 102 in the network is a 3V device, is described above for the case in which relatively few 5V network nodes 102 reside on bus CANBus. For example, if the network is a simple two-node network, with one 3V network node 102*a* and one 5V network node 102*c* (node 102*b* in the example of FIG. 1 being omitted), op amp 420 will be readily able to pull the recessive state common mode bus voltage $V_{CM\_REC}$ to 1.86V. This lower $V_{CM\_REC}$ can be attained in the case of a corresponding receiver in the 5V network node 102*c* applying a 2.5V recessive state common mode voltage to lines CANH, CANL, considering that resistors 430H, 430L are each 30 kΩ resistors while the resistor pair 402H, 404H and the resistor pair 402H, 404H each present an effective resistance of 40 kΩ. The feedback control applied by op amp 420 is able to drive the voltage at node VCM_FB low enough that the sensed common mode bus voltage at node VCM_Sense at one amplifier input can match the reference voltage of 1.86V at the other input.

It is possible that some CAN networks may include a larger number of 5V network nodes, with as few as a single 3V network node. This imbalance of 5V nodes relative to 3V nodes can make it difficult for the 3V node to establish the lower (e.g., 1.86V) recessive state common mode bus voltage $V_{CM\_REC}$.

Figure 6A:
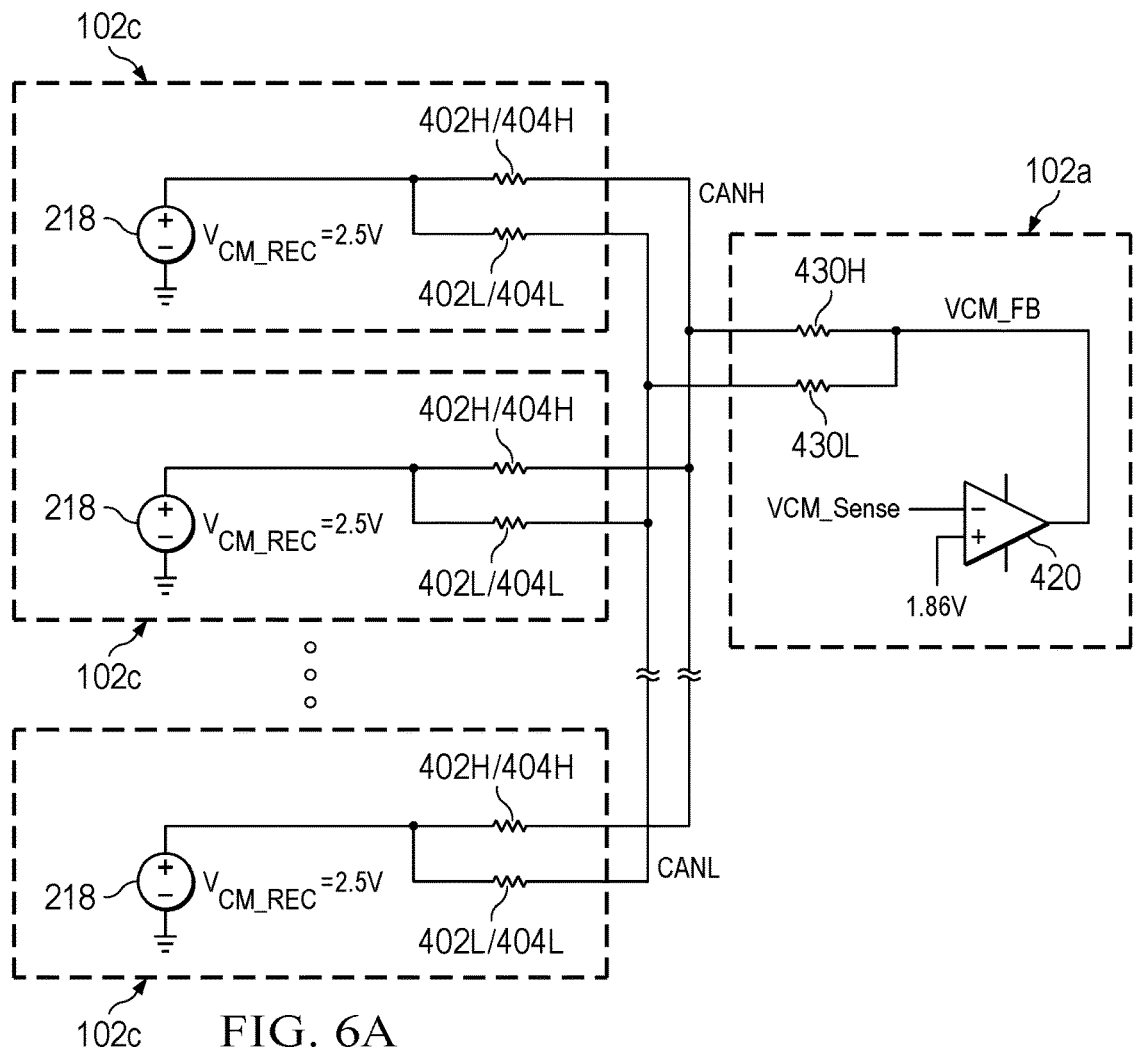
FIG. 6A is an electrical diagram, in block and schematic form, of transceiver circuitry in a heterogeneous CAN network.

FIG. 6A illustrates this difficulty for the case of a CAN network with a single 3V network node and multiple 5V nodes. FIG. 6A illustrates receiver circuitry models for a number of 5V network nodes 102*c* coupled to bus lines CANH, CANL. As shown in FIG. 6A, each receiver circuitry model 204 in these 5V nodes 102*c* includes a voltage source 218 applying recessive state common mode voltage $V_{CM\_REC}$=2.5V to bus lines CANH, CANL via resistor pairs 402H, 404H and 402L, 404L, respectively. For the case in which a 3V network node, for example node 102a, has won bus arbitration and is transmitting over bus CANBus, the dominant state common mode bus voltage $V_{CM\_DOM}$ will be 1.86V. As described above relative to FIG. 5A, this condition will close switch 422 in the 3V network node 102a, such that op amp 420 in that node 102a will attempt to control the recessive state common mode bus voltage $V_{CM\_REC}$ to match the dominant state common mode bus voltage $V_{CM\_DOM}$=1.86V. FIG. 6A illustrates op amp 420 in node 102a with its output coupled to bus lines CANH, CANL through resistors 430H, 430L, respectively.

However, because the same voltage (2.5V in this case) is applied by voltage source 218 from each of the 5V network nodes 102c, the resistor pairs 402H, 404H and 402L, 404L in those nodes 102 are effectively in parallel between the $V_{CM\_REC}$=2.5V potential and bus lines CANH, CANL, respectively. This will reduce the effective parallel resistance between the voltage applied by voltage sources 218 to bus lines CANH, CANL as compared with the resistance (e.g., 30 kΩ) of resistors 430H, 430L coupling the output of op amp 420 to those bus lines CANH, CANL, respectively. With enough 5V nodes 102c connected in parallel in this manner, op amp 420 in 3V node 102a may not be able to pull bus lines CANH, CANL sufficiently low to the level of desired recessive state common mode voltage $V_{CM\_REC}$=1.86V without saturating.

Figure 6B:
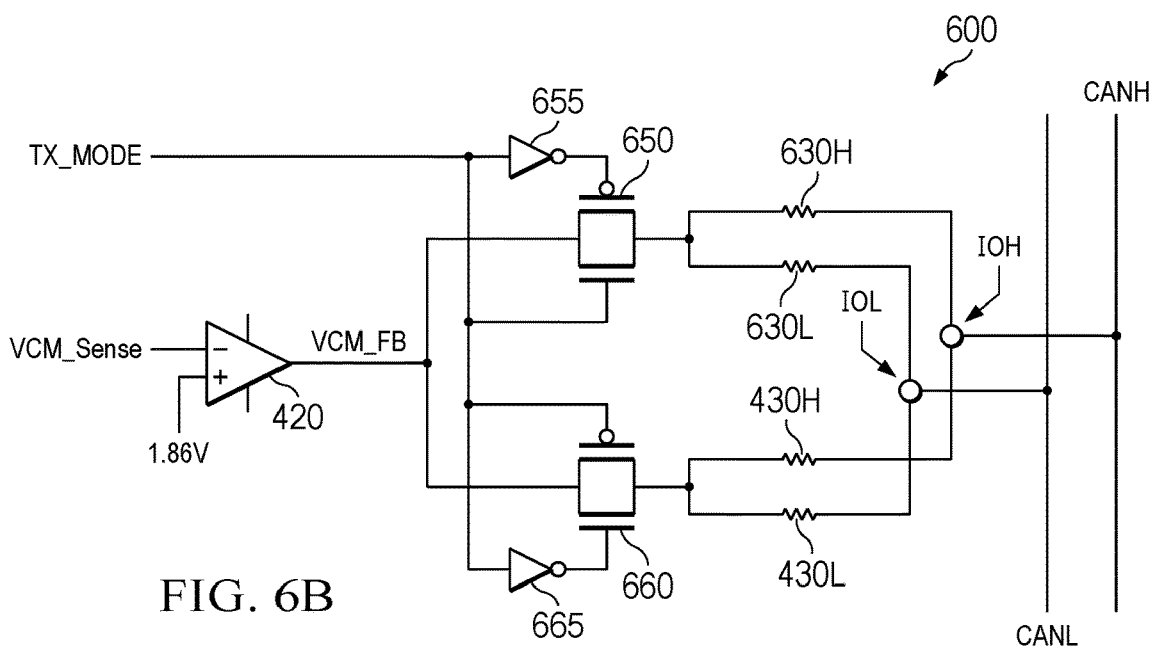
FIG. 6B is an electrical diagram, in schematic form, of common mode control circuitry according to an alternative example embodiment.

FIG. 6B illustrates the construction of control circuitry 600 according to an alternative implementation that has reduced vulnerability to amplifier saturation in heterogeneous networks. As in FIG. 6A, this construction pertains to the portion of control circuitry 600 that is operable when the dominant state common mode bus voltage $V_{CM\_DOM}$ is established (e.g., at 1.86V) by a lower power supply voltage (e.g., 3V) network node 102. In this implementation, op amp 420 is provided as before, with a negative input coupled to node VCM_Sense to receive the common mode bus voltage on bus lines CANH, CANL, and a positive input coupled to receive the desired common mode bus voltage (e.g., 1.86V). The output of op amp 420 at node VCM_FB is coupled in this example, to one side (e.g., the source and/or drain terminals of the two transistors that make up the pass gates) of each of two pass gates 650, 660. The opposite side (e.g., the drain and/or source of the transistors that make up pass gate 650) of pass gate 650 is coupled to terminals IOH, IOL via resistors 630H, 630L, respectively, and the opposite side of pass gate 660 is coupled to terminals IOH, IOL via resistors 430H, 430L, respectively. Terminals IOH, IOL are coupled to bus lines CANH, CANL, respectively. Pass gates 650, 660 each include a p-channel metal-oxide-silicon field-effect (PMOS) transistor and an n-channel metal-oxide-silicon field-effect (NMOS) transistor with the source/drain paths connected in parallel. Pass gates 650, 660 are controlled, in this implementation, by a logic signal on line TX_MODE indicating, for example with a high logic level, that node 102a has won bus arbitration. For example, arbitration logic 312a may include logic circuitry for generating the signal on line TX_MODE, such as based on a combination of control signals on lines TXD, RXD between transceiver 110a and MCU 104a in node 102a. Line TX_MODE is coupled to the gate of the NMOS device of pass gate 650, and is coupled to the PMOS device of pass gate 650 via inverter 655. Conversely, line TX_MODE is coupled to the gate of the PMOS device of pass gate 660, and to the NMOS device of pass gate 660 via inverter 665.

As such, one of pass gates 650, 660 is on (conductive) and the other off, depending on the logic level of line TX_MODE.

As described above relative to FIG. 3, arbitration logic 312a of node 102a determines whether node 102a has won arbitration of bus CANBus. If so, arbitration logic 312a drives a "1" logic state onto line TX_MODE in this example, which enables transmitter 310a to transmit data onto bus CANBus. In the implementation of FIG. 6B, this same line TX_MODE selects whether node VCM_FB is applied to bus lines CANH, CANL via resistors 430H, 430L, or via resistors 630H, 630L. In this example, if node 102a containing control circuitry 600 has won arbitration of bus CANBus and is thus the transmitting node on bus CANBus, arbitration logic 312a asserts a "1" logic level on line TX_MODE, which turns on pass gate 650 such that the output of op amp 420 is applied to bus lines CANH, CANL via resistors 630H, 630L, respectively. Conversely if node 102a has not won the bus arbitration, and another node 102 is the transmitting node on the network, arbitration logic 312a will assert a "0" logic level on line TX_MODE. In this case, pass gate 660 is turned on to couple the output of op amp 420 is applied to bus lines CANH, CANL via resistors 430H, 430L, respectively.

As described above for this implementation, resistors 430H, 430L each have a resistance of about 30 kΩ. In contrast, resistors 630H, 630L may have a much lower resistance, for example on the order of 6 kΩ. This lower resistance of resistors 630H, 630L when its node 102a is the transmitting node enables op amp 420 to pull bus lines CANH, CANL to the desired lower recessive state common mode bus voltage $V_{CM\_REC}$ of 1.86V, even if multiple 5V nodes 102c reside on the bus and driving the higher recessive state common mode bus voltage $V_{CM\_REC}$ of 2.5V. If another 3V node 102 is the transmitting node (and sets the dominant state common mode bus voltage $V_{CM\_DOM}$ to 1.86V), pass gate 660 will instead be turned on by the "0" logic level on line TX_MODE for this node 102a, coupling the higher resistance resistors 430H, 430L between node VCM_FB and bus lines CANH, CANL. This higher resistance of resistors 430H, 430L reduces the loading on bus lines CANH, CANL in the situation in which another 3V node is the transmitting network node.

Incorporation of this alternative implementation of FIG. 6B can provide for a wider range of CAN network implementations for lower power supply voltage transceivers in a legacy context. More specifically, a lower voltage network transceiver can be readily implemented into networks having even a large number of legacy, higher power supply voltage, network nodes.

Figure 7:
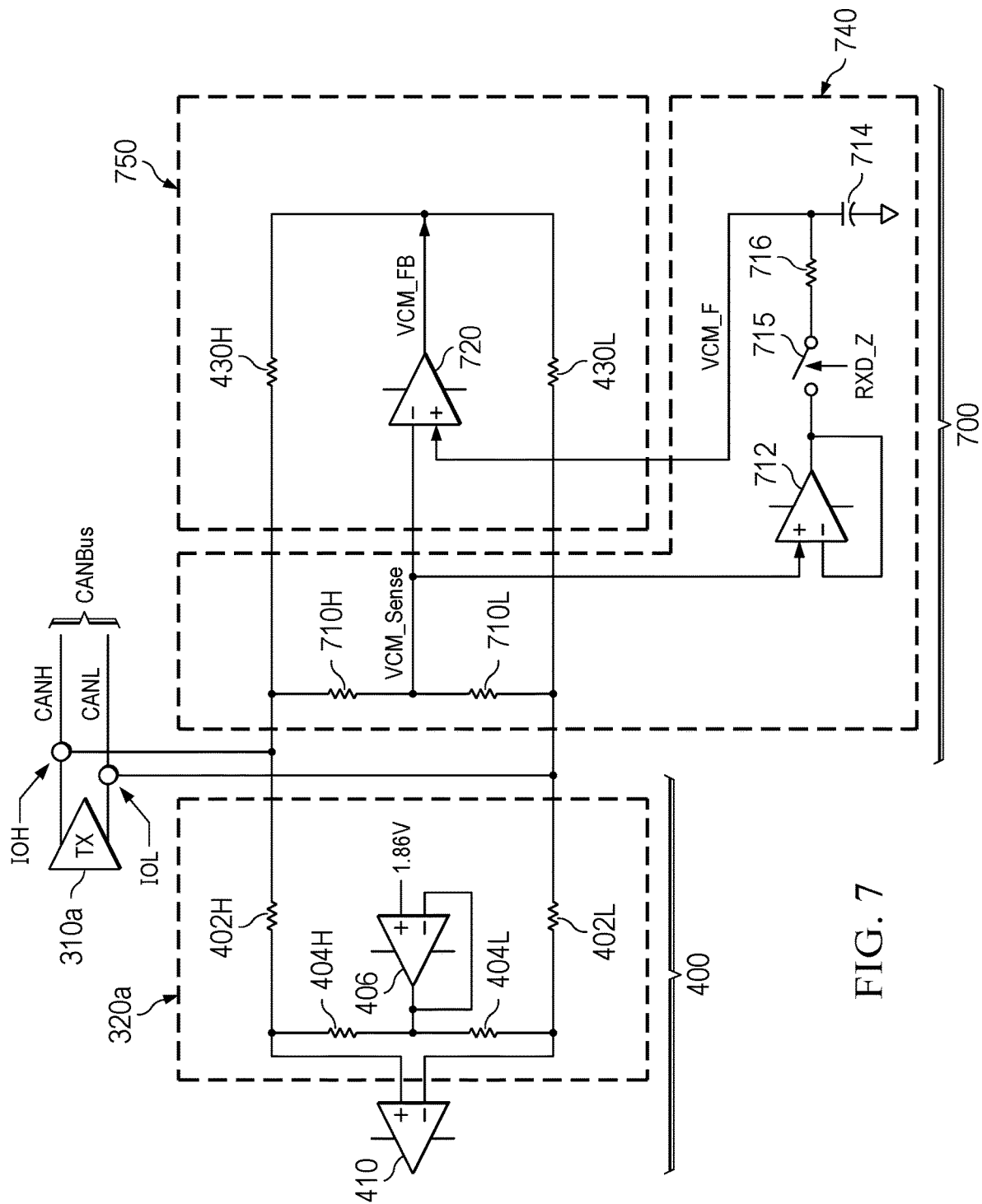
FIG. 7 is an electrical diagram, in schematic form, of common mode voltage control circuitry in combination with transceiver circuitry according to an alternative example embodiment.

FIG. 7 illustrates the construction of common mode voltage control circuitry 700, as may be incorporated into transceiver 110a according to an alternative example embodiment to that described above relative to FIG. 4. According to this example embodiment, common mode voltage control circuitry 700 is configured and operates in transceiver 110a to produce a recessive state common mode voltage $V_{CM\_REC}$ at bus lines CANH, CANL that matches the dominant state common mode voltage $V_{CM\_DOM}$ as sensed by common mode voltage circuitry 700 itself. As described below, common mode voltage control circuitry 700 is constructed to maintain good matching of the dominant and recessive state common mode bus voltages over variations in that voltage.

Transmitter 310a and receiver 400 are constructed and operate similarly as described above in connection with the implementation of FIG. 4. As such, outputs of transmitter 310a and inputs of common mode buffer 320a of receiver 400 are coupled to terminals IOH, IOL of transceiver 110a, which in turn are coupled to respective bus lines CANH, CANL of bus CANBus. As described relative to the circuit model of FIG. 3, receiver common mode buffer 320a includes voltage follower 406 which sets the recessive state common mode voltage $V_{CM\_REC}$ of bus lines CANH, CANL through resistors 404H, 404L, respectively.

Common mode voltage control circuitry 700 in this implementation includes sense circuitry 740 and control circuitry 750. Sense circuitry 740 is configured and operable to sense the common mode voltage on lines CANH, CANL for the dominant state, as set by the transmitting network node 102. Control circuitry 750 is configured and operable to control the common mode voltage for the recessive state to be applied at terminals IOH, IOL to match the dominant state common mode bus voltage sensed by sense circuitry 740.

In this example, sense circuitry 740 includes resistors 710H, 710L coupled in series between terminals IOH, IOL. Resistors 710H, 710L present relatively large resistances, for example on the order of 300 kΩ each, to limit their loading on bus CANBus. Voltage follower 712 in sense circuitry 740 has a positive input coupled to node VCM_Sense between resistors 710H, 710L, and a negative input coupled to its output, which is also coupled to one side of switch 715. As in the implementation described above, line RXD_Z is at a logic high, or "1", level while bus CANBus is in the dominant state, and is at a logic low, or "0", level while bus CANBus is in the recessive state. Switch 715 responds to the logic level on line RXD_Z, and in this example is in a closed state in response to a "1" level on line RXD_Z, and in an open state in response to a "0" level on line RXD_Z. Switch 715 may be implemented as a switching transistor, for example an n-channel MOS transistor with its source/drain path coupled between the output of voltage follower 712 and resistor 716, and with a control terminal coupled to receive a control signal on line RXD_Z issued from transceiver 110a. Resistor 716 in sense circuitry 740 is coupled between switch 715 and node VCM_F. Capacitor 414 is coupled between this node VCM_FB and circuit ground, and together with resistor 716 provides a low-pass filter to limit high frequency noise on the sensed common mode voltage at node VCM_Sense as output by voltage follower 712.

As configured according to this example embodiment shown in FIG. 7, sense circuitry 440 operates to present a voltage at node VCM_F that corresponds to the sensed common mode voltage at node VCM_Sense during such time as bus CANBus is in the dominant state. This sensed dominant state common mode voltage at node VCM_F is used by control circuitry 750 in this example embodiment to control the recessive state common mode voltage at bus lines CANH, CANL, as will now be described.

In this example implementation, control circuitry 750 includes operational amplifier ("op amp") 720. A positive input of op amp 720 is coupled to receive the voltage at node VCM_F, and a negative input of op amp 720 is coupled to node VCM_Sense. The output of op amp 720 is coupled to node VCM_FB, which is coupled via terminals IOH, IOL to bus lines CANH, CANL, through resistors 730H, 730L, respectively.

In operation, sense circuitry 740 in common mode control circuitry 700 according to this example embodiment senses the dominant state common mode voltage on bus CANBus, via resistors 710H, 710L and node VCM_Sense, and applies a feedback voltage to control circuitry 750 via node VCM_F. Op amp 720 in control circuitry 750 operates to produce a voltage at node VCM_FB that causes its two input voltages (on nodes VCM_Sense and VCM_F) to be equal. In other words, control circuitry 750 drives node VCM_FB to a voltage that ensures that the recessive state common mode bus voltage $V_{CM\_REC}$ is the same as the dominant state common mode bus voltage $V_{CM\_DOM}$ as sensed by sense circuitry 740. As described above in connection with FIG. 5B, the particular voltage driven by op amp 720 at node VCM_FB will depend on the resistances presented by resistors 730H, 702H, 704H for bus line CANH and resistors 730L, 702L, 704L for bus line CANL.

Further in the alternative, control circuitry 700 of FIG. 7 may be further modified according to the implementation described above relative to FIG. 6B, in order to reduce its vulnerability to amplifier saturation in heterogeneous networks. As described above relative to FIG. 6B, that alternative construction as applied to control circuitry 700 switches in different values of resistance between node VCM_FB and terminals IOH, IOL, depending on whether its network node 102a has won arbitration of bus CANBus. Saturation of op amp 720 in the case in which multiple 5V network nodes are driving a higher recessive state common mode voltage may thus be avoided.

As used herein, the terms "terminal", "node", "interconnection," "lead," and "pin" are used interchangeably. Unless specifically stated to the contrary, these terms are generally used to mean an interconnection between or a terminus of a device element, a circuit element, an integrated circuit, a device, or other electronics or semiconductor component.

Unless otherwise stated, "about," "approximately," or "substantially" preceding a value means+/−10 percent of the stated value. Modifications are possible in the described examples, and other examples are possible within the scope of the claims.

While the use of particular transistors are described herein, other transistors (or equivalent devices) may be used instead with little or no change to the remaining circuitry. For example, a metal-oxide-silicon FET ("MOSFET") (such as an n-channel MOSFET, nMOSFET, or a p-channel MOSFET, pMOSFET), a bipolar junction transistor (BJT—e.g. NPN or PNP), insulated gate bipolar transistors (IGBTs), and/or junction field effect transistor (JFET) may be used in place of or in conjunction with the devices disclosed herein. The transistors may be depletion mode devices, drain-extended devices, enhancement mode devices, natural transistors or other type of device structure transistors. Furthermore, the devices may be implemented in/over a silicon substrate (Si), a silicon carbide substrate (SiC), a gallium nitride substrate (GaN) or a gallium arsenide substrate (GaAs).

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party. While, in some example embodiments, certain elements are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value, or, if the value is zero, a reasonable range of values around zero. Modifications are possible in the described examples, and other examples are possible within the scope of the claims.

While one or more embodiments have been described in this specification, it is of course contemplated that modifications of, and alternatives to, these embodiments, such modifications and alternatives capable of obtaining one or more of the technical effects of these embodiments, will be apparent to those of ordinary skill in the art having reference to this specification and its drawings. It is contemplated that such modifications and alternatives are within the scope of the claims presented herein.

What is claimed is:

1. A transceiver, comprising:
    a network bus having first and second lines
    a transmitter coupled to first and second terminals of the transceiver, the first and second terminals of the transceiver coupled to the first and second lines of the network bus, and the transmitter configured to drive a differential voltage at the first and second terminals to communicate a dominant state at the network bus, the differential voltage establishing a dominant state common mode voltage;
    a receiver coupled to the first and second terminals;
    sense circuitry coupled to the first and second terminals and configured to compare the dominant state common mode voltage at the first and second terminals with a threshold voltage; and
    control circuitry coupled to the first and second terminals and to the sense circuitry, the control circuitry configured to control a recessive state common mode voltage responsive to comparing the dominant state common mode voltage with the threshold voltage.

2. The transceiver of claim 1, wherein the control circuitry is further configured to:
    control the recessive state common mode voltage at the first and second terminals to a first recessive state common mode voltage responsive to the dominant state common mode voltage being below the threshold voltage; and
    control the recessive state common mode voltage at the first and second terminals to a second recessive state common mode voltage, higher than the first recessive state common mode voltage, responsive to the dominant state common mode voltage being above the threshold voltage.

3. The transceiver of claim 2, wherein the transceiver is adapted to be biased from a power supply voltage;
    wherein the dominant state common mode voltage is based on the power supply voltage;
    and wherein the threshold voltage is higher than the dominant state common mode voltage.

4. The transceiver of claim 3, wherein the receiver comprises:
    a comparator; and
    a common mode buffer, comprising:
        a first resistor coupled between the first terminal and a first input of the comparator;
        a second resistor coupled between the second terminal and a second input of the comparator; and
        receiver common mode circuitry configured to apply a common mode voltage at the first and second terminals corresponding to the first recessive state common mode voltage.

5. The transceiver of claim 4, wherein the sense circuitry comprises:
    first and second sense resistors, each coupled between the first and second terminals, respectively, and a sense node; and
    a comparator, having a first input coupled to the sense node and a second input receiving the threshold voltage, and having an output coupled to the control circuitry.

6. The transceiver of claim 5, wherein the control circuitry comprises:
    first and second feedback resistors coupled between the first and second terminals, respectively, and a common mode feedback node;
    a first amplifier circuit;
    a second amplifier circuit; and
    a switch circuit configured to couple an output of the first amplifier circuit to the common mode feedback node responsive to the output of the comparator at a first state, and configured to couple an output of the second amplifier circuit to the common mode feedback node responsive to the output of the comparator at a second state;
    wherein the first amplifier circuit is configured to apply a voltage at its output, when coupled to the common mode feedback node through the switch circuit, corresponding to the first recessive state common mode voltage;

and wherein the second amplifier circuit is configured to apply a voltage at its output that, when coupled to the common mode feedback node through the switch circuit, establishes a voltage at the first and second terminals corresponding to the second recessive state common mode voltage.

7. The transceiver of claim 6, wherein the voltage applied by the second amplifier circuit is selected to result in a Thevenin voltage at the first and second terminals that substantially matches the second recessive state common mode voltage.

8. The transceiver of claim 6, wherein the first amplifier circuit comprises:
an operational amplifier having a negative input coupled to the sense node, a positive input receiving the first recessive state common mode voltage, and an output coupled to the switch circuit.

9. The transceiver of claim 6, further comprising:
arbitration logic, configured to present a mode signal to the transmitter;
and wherein the control circuitry comprises:
  first and second feedback resistors coupled to the first and second terminals, respectively;
  third and fourth feedback resistors coupled to the first and second terminals, respectively, each of the third and fourth feedback resistors having a resistance lower than a resistance of each of the first and second feedback resistors;
  a first select gate coupled between the common mode feedback node and the first and second feedback resistors, and having a select input receiving a select signal corresponding to the mode signal;
  a second select gate coupled between the common mode feedback node and the third and fourth feedback resistors, and having a select input receiving a complement of the select signal;
  a first amplifier circuit;
  a second amplifier circuit; and
  a switch circuit configured to couple an output of the first amplifier circuit to the common mode feedback node responsive to the output of the comparator at a first state, and configured to couple an output of the second amplifier circuit to the common mode feedback node responsive to the output of the comparator at a second state;
wherein the first amplifier circuit is configured to apply a voltage at its output, when coupled to the common mode feedback node through the switch circuit, corresponding to the first recessive state common mode voltage;
and wherein the second amplifier circuit is configured to apply a voltage at its output that, when coupled to the common mode feedback node through the switch circuit, establishes a voltage at the first and second terminals corresponding to the second recessive state common mode voltage.

10. The transceiver of claim 1, wherein the control circuitry is configured to control the recessive state common mode voltage to substantially match the sensed dominant state common mode voltage.

11. The transceiver of claim 10, wherein the sense circuitry comprises:

first and second sense resistors, each coupled between the first and second terminals, respectively, and a sense node; and
circuitry configured to couple a voltage at the sense node to a feedback node during a dominant state at the first and second terminals;
and wherein the control circuitry comprises:
  first and second feedback resistors coupled between the first and second terminals, respectively, and a common mode feedback node; and
  an operational amplifier, having a first input coupled to the sense node, a second input coupled to the feedback node, and an output coupled to the common mode feedback node.

12. A controller area network, comprising:
a bus comprising first and second bus lines;
a first network node circuit biased from a first power supply voltage, the first network node circuit including:
  a transmitter coupled to the first and second bus lines, and configured to drive a differential voltage at the first and second bus lines to communicate a dominant state at the bus, the differential voltage establishing a first dominant state common mode voltage; and
  a receiver coupled to the first and second bus lines and configured to apply a first recessive state common mode voltage to the first and second bus lines; and
a second network node circuit biased from a second power supply voltage lower than the first power supply voltage, the second network node circuit including:
  a transmitter coupled to the first and second bus lines, and configured to drive a differential voltage at the first and second bus lines to communicate a dominant state at the bus, the differential voltage establishing a second dominant state common mode voltage being lower than the first dominant state common mode voltage;
  a receiver coupled to the first and second bus lines and configured to apply a second recessive state common mode voltage to the first and second bus lines, the second recessive state common mode voltage being lower than the first recessive state common mode voltage;
  sense circuitry coupled to the first and second bus lines and configured to sense a dominant state common mode voltage at the first and second bus lines; and
  control circuitry coupled to the first and second bus lines and to the sense circuitry, the control circuitry configured to control a recessive state common mode voltage responsive to the sensed common mode voltage.

13. The network of claim 12, wherein the sense circuitry of the second network node circuit is further configured to compare the sensed common mode voltage with a threshold voltage;
and wherein the control circuitry of the second network node is further configured to:
  control a recessive state common mode voltage at the first and second bus lines to a first recessive state common mode voltage responsive to the sensed common mode voltage being below the threshold voltage; and
  control the recessive state common mode voltage at the first and second bus lines to a second recessive state common mode voltage, higher than the first recessive state common mode voltage, responsive to the sensed common mode voltage being above the threshold voltage.

14. The network of claim 13, wherein the control circuitry comprises:
   first and second feedback resistors coupled between the first and second bus lines, respectively, and a common mode feedback node;
   a first amplifier circuit;
   a second amplifier circuit; and
   a switch circuit configured to couple an output of the first amplifier circuit to the common mode feedback node responsive to the output of the comparator at a first state, and configured to couple an output of the second amplifier circuit to the common mode feedback node responsive to the output of the comparator at a second state;
   wherein the first amplifier circuit is configured to apply a voltage at its output that, when coupled to the common mode feedback node through the switch circuit, establishes a voltage at the first and second bus lines corresponding to the first recessive state common mode voltage;
   and wherein the second amplifier circuit is configured to apply a voltage at its output, when coupled to the common mode feedback node through the switch circuit, corresponding to the second recessive state common mode voltage.

15. The network of claim 14, wherein the voltage applied by the first amplifier circuit is selected to result in a Thevenin voltage at the first and second bus lines that substantially matches the first dominant state common mode voltage.

16. The network of claim 14, wherein the second amplifier circuit comprises:
   an operational amplifier having a negative input coupled to the sense node, a positive input receiving the second recessive state common mode voltage, and an output coupled to the switch circuit.

17. The network of claim 14, wherein the second network node circuit further comprises:
   arbitration logic, configured to present a mode signal to the transmitter responsive to the second network node winning bus arbitration;
   and wherein the control circuitry comprises:
      first and second feedback resistors coupled to the first and second terminals, respectively;
      third and fourth feedback resistors coupled to the first and second terminals, respectively, each of the third and fourth feedback resistors having a resistance lower than a resistance of each of the first and second feedback resistors;
      a first select gate coupled between the common mode feedback node and the first and second feedback resistors, and having a select input receiving a select signal corresponding to the mode signal;
      a second select gate coupled between the common mode feedback node and the third and fourth feedback resistors, and having a select input receiving a complement of the select signal;
      a first amplifier circuit;
      a second amplifier circuit; and
      a switch circuit configured to couple an output of the first amplifier circuit to the common mode feedback node responsive to the output of the comparator at a first state, and configured to couple an output of the second amplifier circuit to the common mode feedback node responsive to the output of the comparator at a second state;
   wherein the first amplifier circuit is configured to apply a voltage at its output that, when coupled to the common mode feedback node through the switch circuit, establishes a voltage at the first and second bus lines corresponding to the first recessive state common mode voltage;
   and wherein the second amplifier circuit is configured to apply a voltage at its output, when coupled to the common mode feedback node through the switch circuit, corresponding to the second recessive state common mode voltage.

18. The network of claim 13, wherein the receiver of the first network nodes comprises:
   a comparator; and
   a common mode buffer, comprising:
      a first resistor coupled between the first terminal and a first input of the comparator;
      a second resistor coupled between the second terminal and a second input of the comparator; and
      receiver common mode circuitry configured to apply a common mode voltage at the first and second terminals corresponding to the first recessive state common mode voltage;
   and wherein the receiver of the second network node circuit comprises:
      a comparator;
      a first resistor coupled between the first terminal and a first input of the comparator;
      a second resistor coupled between the second terminal and a second input of the comparator; and
      receiver common mode circuitry configured to apply a common mode voltage at the first and second terminals corresponding to the second recessive state common mode voltage.

19. The network of claim 12, wherein the control circuitry of the second network node circuit is configured to control the recessive state common mode voltage to substantially match the sensed dominant state common mode voltage.

20. The network of claim 19, wherein the sense circuitry of the second network node circuit comprises:
   first and second sense resistors, each coupled between the first and second bus lines, respectively, and a sense node; and
   circuitry configured to couple a voltage at the sense node to a feedback node during a dominant state at the first and second bus lines;
   and wherein the control circuitry of the second network node comprises:
      first and second feedback resistors coupled between the first and second bus lines, respectively, and a common mode feedback node; and
      an operational amplifier, having a first input coupled to the sense node, a second input coupled to the feedback node, and an output coupled to a common mode feedback node.

21. A method of communicating data in a network over a bus comprised of first and second bus lines, comprising:
   for communication of a first data level on the bus, applying a differential voltage across the first and second bus lines from a transmitter, the differential voltage establishing a dominant state common mode bus voltage;

for communication of a second data level on the bus, applying a recessive state common mode bus voltage to the first and second bus lines from a receiver;
at a first transceiver coupled to the bus, the first transceiver comprising a transmitter and a receiver, the receiver of the first transceiver configured to apply a first recessive state common mode bus voltage:
comparing the dominant state common mode bus voltage on the first and second bus lines with a threshold voltage; and
applying a recessive state common mode bus voltage on the first and second bus lines responsive to comparing the dominant state common mode bus voltage with the threshold voltage.

22. The method of claim 21, wherein the step of applying a recessive state common mode bus voltage comprises:
responsive to the dominant state common mode bus voltage being higher than the threshold voltage, applying a second recessive state common mode bus voltage to the first and second bus lines, the second recessive state common mode bus voltage being higher than the first recessive state common mode bus voltage.

23. The method of claim 21, further comprising:
at the first transceiver, responsive to the dominant state common mode bus voltage being lower than the threshold voltage, applying the first recessive state common mode bus voltage to the first and second bus lines through first and second resistors, respectively.

24. The method of claim 23, further comprising:
performing bus arbitration in the network;
and wherein, responsive to the first transceiver winning the bus arbitration, the first recessive state common mode bus voltage is applied to the first and second bus lines through third and fourth resistors, respectively, the third and fourth resistors having lower resistance than the first and second resistors, respectively.

25. The method of claim 21 wherein the step of applying a recessive state common mode bus voltage comprises applying a recessive state common mode bus voltage that substantially matches the dominant state common mode bus voltage.

* * * * *